May 19, 1942.   M. P. YOUKER   2,283,305
HYDROCARBON GAS CONVERSION PROCESS
Filed April 2, 1931
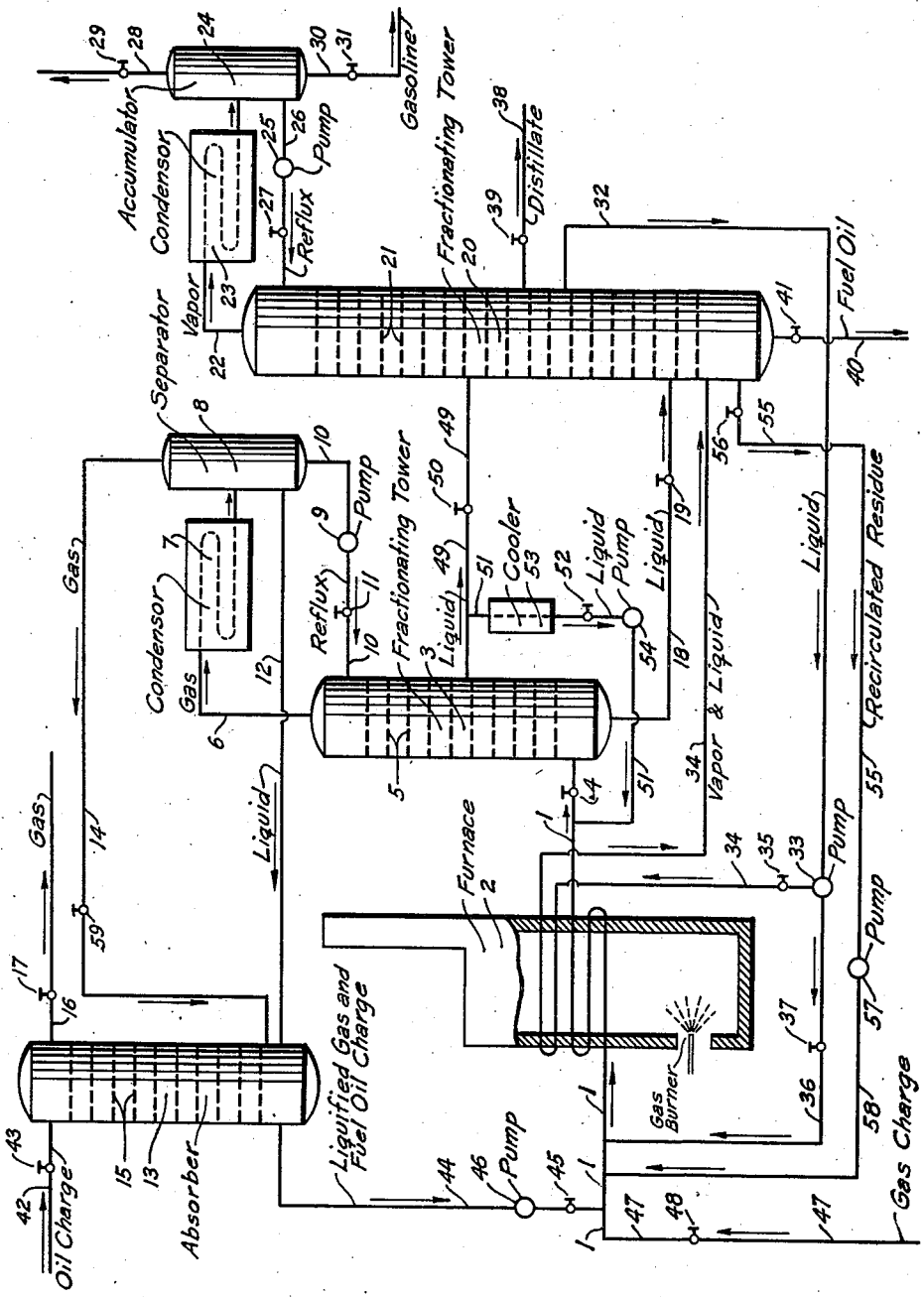
Malcolm P. Youker   INVENTOR.

Patented May 19, 1942

2,283,305

UNITED STATES PATENT OFFICE 2,283,305

HYDROCARBON GAS CONVERSION PROCESS

Malcolm P. Youker, Bartlesville, Okla., assignor to Phillips Petroleum Company, Bartlesville, Okla., a corporation of Delaware Application April 2, 1931, Serial No. 527,267

15 Claims. (Cl. 196—9)

This application for patent is a continuation in part of and should be taken in connection with application for patent disclosing a gas conversion process, filed by Malcolm P. Youker in the United States Patent Office on May 1, 1925, under United States Patent Office Serial Number 27,234 (Patent No. 1,800,586). My new improvement which is disclosed herein has particular reference to the conversion of cracked hydrocarbon gases to hydrocarbon liquids.

The principal object of my new improvement is to provide a method by which hydrocarbon gases produced by cracking stills may be converted to hydrocarbon liquids. Other advantages are obtained by my new improvement which will be made apparent in the following discussion.

My new improvement will be understood from the following discussion taken in connection with the attached drawing on which a form of apparatus, through the use of which my improved process may be carried out, is illustrated in side elevation.

Referring to the drawing, a mixture of liquefied hydrocarbon gas and hydrocarbon liquid, the source of which will be designated later, will be caused to flow through a pipe 1 which leads through a furnace 2 into the bottom of a high pressure fractionating column 3 and in which is mounted a valve 4. This mixture will be heated while passing through pipe 1 and the furnace 2 to a temperature between 750° F. and 950° F. and will be delivered into the bottom of the fractionating column 3 in a partially vaporized state. Vapors thus delivered into the bottom of the fractionating column 3 will flow thence upward through the bubble plates 5 in fractionating column 3 and thence through a pipe 6 which leads through a condenser 7 into a gas liquid separator 8. Part of the vapors which pass through the pipe 6 and condenser 7 will be condensed therein and a mixture of gas and liquid will flow from the pipe 6 into the separator 8. A sufficient quantity of the liquid which will accumulate in separator 8 will be delivered by a pump 9 through a pipe 10 in which is mounted a valve 11 into the top of fractionating column 3 to condense in fractionating column 3 all of the gasoline and heavier vapors delivered into fractionating column 3. That part of the liquid which accumulates in separator 8 in excess of the liquid withdrawn therefrom through pipe 10 will flow therefrom through a pipe 12 into the bottom of an absorbing column 13. Gas will flow from the top of separator 8 through a pipe 14 into the bottom of absorber 13 and thence upward through bubble plates 15 in absorber 13 and thence from the top of absorber 13 through a pipe 16 in which is mounted a back pressure valve 17. Liquid will be released from the bottom of fractionating column 3 through a pipe 18 in which is mounted a valve 19 into a fractionating column 20. By means of the valve 19 and the valve 17 pressure will be maintained in the fractionating column 3 in excess of the pressure which will be maintained in the fractionating column 20 and as a result liquid which will flow into fractionating column 20 through the pipe 18 will partially vaporize upon entry into fractionating column 20 and vapors thus produced will flow upward through bubble plates 21 in fractionating column 20 and thence through a pipe 22 which leads through a condenser 23 into an accumulator tank 24. A sufficient quantity of liquid will be delivered from accumulator 24 by a pump 25 through pipe 26 in which is mounted a valve 27 into the top of fractionating column 20 to condense in fractionating column 20 all of the vapors introduced therein except gasoline vapors. Thus gasoline vapors only will flow through pipe 22 and condenser 23 and gasoline only will flow into accumulator 24. A vent line 28 in which is mounted a valve 29 is provided for the release from accumulator tank 24 of any gas which may inadvertently accumulate therein. Gasoline will be withdrawn from the bottom of accumulator tank 24 through a pipe 30 in which is mounted a valve 31. Some of the liquid which will flow downward in the fractionating column 20 over bubble plates 21 may be withdrawn through a pipe 32 from one of bubble plates 21 which is located above the point of entry of pipe 19 into fractionating column 20 and may be forced by a pump 33 through a pipe 34 in which is mounted a valve 35 and which leads through the furnace 2 into the bottom of fractionating column 20. Liquid which may be delivered through pipe 34 may be heated in the furnace 2 and thus the fractionating column 20 may be heated. Liquid may be withdrawn from fractionating column 20 through pipe 32 and may be delivered by pump 33 through a pipe 36 in which is mounted a valve 37 into and through the pipe 1. Residue may be withdrawn from the bottom of fractionating column 20 through a pipe 55 in which is mounted a valve 56 by a pump 57 and may be forced by pump 57 through a pipe 58 into and through pipe 1. Distillate may be drawn from one of the bubble plates 21 through a pipe 38 in which is mounted a valve 39. Fuel oil will be withdrawn from the bottom of fractionating column 20 through a pipe 40 in which is mounted a valve 41. Hydrocarbon liquid such as crude oil or fuel oil or the like will be delivered through a pipe 42 in which is mounted a valve 43 into the top of absorber 13 and will flow thence downward over bubble plates 15, contacting and absorbing a portion of the gas which will flow upward through absorber 13. A mixture of oil and liquefied gas which will collect in the bottom of absorber 13 will be delivered by means of a pump 46 through a pipe 44 in which is mounted a valve 45 into and through the pipe 1. In case a supply of cracked gas is available, such gas may be delivered through a pipe 47 in which is mounted a valve 48 into and through pipe 1. Delivery of gas from an extraneous source to the process through the pipe 47 is optional as the process may be carried out either with or without thus supplying gas to the process. A portion of the liquid which flows downward over bubble plates 5 in fractionating column 3 may be withdrawn from an intermediate one of bubble trays 5 and discharged therefrom through the pipe 49 and valve 50 into fractionating column 20 at a point intermediate between bubble trays 21 as a means of increasing the degree of rectification obtained through the combined use of the fractionating columns 3 and 20. A portion of the liquid which flows downward over bubble plates 5 may be withdrawn from the fractionating column 3 through a portion of the pipe 49 and through a pipe 51 and a valve 52 and through a cooler 53 and may be delivered by a pump 54 which is mounted in pipe 51 into the pipe 1 and through valve 4 to cool the liquid which is expanded through valve 4 and to wash the parts of the valve 4 and maintain these parts in a workable condition.

Conversion of hydrocarbons will take place in the pipe 1 and the maintenance of higher pressures in the pipe 1 will result in increased conversion of gas to liquid therein. Although some conversion of gas to liquid may be obtained in the pipe 1 under pressures below 500 pounds per square inch, I will preferably maintain pressure in the pipe 1 above 500 pounds per square inch. In so far as conversion of gases to liquids is concerned it would be advantageous to maintain a pressure in the pipe 1 of 5000 pounds, or upwards; however, the maintenance of such a pressure in a commercial unit of this type would be impractical as no materials of construction are available from which such a unit could be economically constructed for commercial use.

I have confined mixtures of fuel oil and cracked gas and heated the confined mixture to temperatures as high as 900° F. noting the pressure set up by the heated mixtures and found that equilibrium pressure for these mixtures at 850° F. and higher are 3000 pounds per square inch and higher. The apparatus which I used was constructed for a maximum operating pressure of 4000 pounds per square inch at 900° F. and I found that a mixture of light gas and gas oil set up 4000 pounds per square inch pressure when heated to 900° F. These were the maximum conditions under which I made tests. I have tested many different mixtures of cracked gas and fuel oil and find that equilibrium pressures for various mixtures taken at the same temperature vary widely. Good results may be obtained when converting these mixtures under pressures below equilibrium pressure, and for practical reasons I intend to so operate. It is desirable to vary the pressure maintained in the pipe 1. When converting mixtures of gas and fuel oil which have high equilibrium pressures I intend to convert under higher pressures and vice versa.

I have converted various mixtures of cracked gas and fuel oil in a tube similar to the pipe 1 under pressures ranging from 1000 pounds per square inch to 3000 pounds per square inch and at temperatures ranging from 910° F. and lower and I find that in order to obtain a maximum yield of gasoline from the various mixtures which I have tried it is necessary to alter both the temperature and pressure under which the conversion of the various mixtures is obtained. Also the composition of the gasoline produced varies with the pressure of conversion.

In order to secure flexibility of operation I intend to construct the pipe 1 to hold as much as 3000 pounds pressure per square inch at 900° F. and by manipulation of the valve 4 try various conversion conditions of both temperature and pressure to ascertain the best conversion conditions for any particular mixture. The results of the many tests which I have conducted indicate that for the production of gasoline the best conversion temperature will be close to 850° F. and the best conversion pressure will be between 1000 pounds per square inch and 3000 pounds per square inch.

By means of operating the valves 19, 50, 59, and 17, I will normally maintain a pressure in the fractionating column 3 and separator 8 and the absorber 13 and in interconnecting lines sufficiently high so that gases leaving the top of fractionating column 3 through pipe 6 will be stripped of gasoline vapors. This pressure should be maintained at from 250 pounds to 400 pounds per square inch. There is no reason why this pressure should not be maintained above 400 pounds per square inch except that the cost of equipment would be correspondingly higher. If this pressure is maintained below 250 pounds per square inch and the temperature of cooling water used in condenser 7 is 90° F. to 100° F. some gasoline will escape through this condenser with the gas which leaves the top of fractionating column 3. By means of a valve 59 which is disposed in pipe 14 the pressure in absorber 13 may be held lower than the pressure held in separator 8.

By means of operating valves 29, 31, 41, and 39, a pressure only sufficient to cause condensation of gasoline vapors in the condenser 23 will be maintained in the fractionating column 20 and the accumulator 24 and interconnecting lines.

This process may be started in operation by charging fuel oil only through the pipe 1 and as soon as any gas is produced as a result of so charging fuel oil to the process a portion of this gas will be liquefied by the incoming charge of oil and will be added thereto. It should be noted particularly that by this process comparatively heavy oils may be converted to gasoline and that gas which results from such conversion may be returned through the process and thereby reconverted and liquefied. Gas obtained from a source extraneous to the process may or may not be processed as dictated by any particular set of circumstances.

While I have illustrated in detail one method by which my new improvements may be carried out, I do not propose to be limited to the particular methods illustrated but intend to claim broadly all of the advantages which are inherent in my invention.

I claim:
1. The process of converting cracked hydrocarbon gases to comparatively less volatile hydrocarbon liquids, comprising contacting a stream of hydrocarbon liquid with a stream of cracked hydrocarbon gases and thereby absorbing some of said gases in said stream of hydrocarbon liquid, mixing a heavy hydrocarbon liquid with the stream of liquid which results from said contact and then subjecting the resulting mixture to sufficient heat and superatmospheric pressure to convert the mixture into new hydrocarbon compounds, mixing with the product of said conversion a comparatively cool hydrocarbon liquid, expanding the product of said last mentioned mixing into a zone of lower pressure, separating the expanded mixture in said zone into a light liquid fraction, a heavier liquid fraction and a gaseous fraction, said gaseous fraction being the first mentioned stream of hydrocarbon gases, introducing said liquid fractions into a common second fractionating zone, fractionating the same therein into a plurality of fractions, and mixing one of the liquid fractions from the last mentioned zone with the first mentioned hydrocarbon liquid and said heavy hydrocarbon liquid.

2. The process of converting cracked hydrocarbon gases to comparatively less volatile hydrocarbon liquids, comprising contacting a stream of hydrocarbon liquid with a stream of cracked hydrocarbon gases and thereby absorbing some of said gases in said stream of hydrocarbon liquid, mixing a heavy hydrocarbon liquid with the stream of liquid which results from said contact and then subjecting the resulting mixture to sufficient heat and superatmospheric pressure to convert the mixture into new hydrocarbon compounds, mixing with the product of said conversion a comparatively cool hydrocarbon liquid, expanding the product of said last mentioned mixing into a zone of lower pressure, separating the expanded mixture in said zone into a light liquid fraction, a heavier liquid fraction and a gaseous fraction, said gaseous fraction being the first mentioned stream of hydrocarbon gases, introducing said liquid fractions into a common second fractionating zone, fractionating the same therein into a plurality of fractions, and mixing one of the liquid fractions which is heavier than gasoline and lighter than the heaviest fraction from the last mentioned zone, with the first mentioned heavy hydrocarbon liquid.

3. The process of converting cracked hydrocarbon gases to comparatively less volatile hydrocarbon liquids, comprising contacting a stream of hydrocarbon liquid with a stream of cracked hydrocarbon gases and thereby absorbing some of said gases in said stream of hydrocarbon liquid, mixing a heavy hydrocarbon liquid with the stream of liquid which results from said contact and then subjecting the resulting mixture to sufficient heat and superatmospheric pressure to convert the mixture into new hydrocarbon compounds, mixing with the product of said conversion a comparatively cool hydrocarbon liquid, expanding the product of said last mentioned mixing into a zone of lower pressure, separating the expanded mixture in said zone into a light liquid fraction, a heavier liquid fraction and a gaseous fraction, said gaseous fraction being the first mentioned stream of hydrocarbon gases, introducing said liquid fractions into a common second fractionating zone, fractionating the same therein into a plurality of fractions, and mixing the heaviest one of the liquid fractions from the last mentioned zone with the first mentioned heavy hydrocarbon liquid.

4. The process of converting a mixture consisting of normally liquid hydrocarbons and normally gaseous hydrocarbons into new hydrocarbon compounds, comprising heating said mixture to a temperature between 750° and 950° F. while under a superatmospheric pressure between 500 pounds and 5000 pounds per square inch, separating the mass thus produced into a gaseous fraction and a plurality of liquid fractions while under superatmospheric pressure, separately expanding said liquid fractions from under said superatmospheric pressure into a single fractionating zone, and subsequent to said expansion, separating gasoline from said liquid fractions in said fractionating zone.

5. In a process of the character described, subjecting a mixture of normally gaseous hydrocarbons and normally liquid hydrocarbons to thermal conversion under superatmospheric pressure expanding the mixture of converted hydrocarbons while in heated condition resulting from said thermal conversion and while at superatmospheric pressure into a fractionating zone, subjecting the mixture in the fractionating zone to reflux condensation and thereby separating hydrocarbons lighter than gasoline from gasoline and heavier liquids, dividing said gasoline and heavier liquids in the fractionating zone into a stream of light liquid hydrocarbons and a heavier stream of liquid hydrocarbons, separately discharging said streams of liquid hydrocarbons from said fractionating zone, cooling a portion of the stream of light liquid hydrocarbons, and introducing said portion after cooling and under superatmospheric pressure into the first mentioned mixture after conversion and before expanding the latter into the fractionating zone.

6. In a process of the character described, subjecting a mixture of normally gaseous hydrocarbons and normally liquid hydrocarbons to thermal conversion under superatmospheric pressure introducing the converted mixture of hydrocarbons while in heated condition resulting from the thermal conversion and while under superatmospheric pressure into a fractionating zone, maintaining said zone under superatmospheric pressure, subjecting the mixture in said zone to reflux condensation and thereby separating hydrocarbons lighter than gasoline from gasoline and heavier hydrocarbons, discharging the hydrocarbons lighter than gasoline from the upper portion of said zone, dividing the gasoline and heavier hydrocarbons in said zone into a stream of light liquid hydrocarbons and a stream of heavier liquid hydrocarbons, separately discharging said streams of liquid hydrocarbons from said zone and expanding the same at separate points into a second fractionating zone, and subjecting said streams in the second fractionating zone to reflux condensation and thereby separating gasoline from heavier hydrocarbons.

7. In a process of the character described, subjecting a mixture of normally gaseous hydrocarbons and normally liquid hydrocarbons to thermal conversion under superatmospheric pressure, introducing the mixture resulting from the thermal conversion while in heated condition and under superatmospheric pressure into a fractionating zone, separating the converted mixture in said zone into fractions, one of said fractions being a liquid fraction, introducing said liquid fraction into a second fractionating zone at a first point above the bottom of said second fractionating zone, recirculating liquid from said second fractionating zone at a higher point through a heating zone and back into the second fractionating zone at a lower point than said first point, and withdrawing products of the process from the second fractionating zone at points above and below the first three points.

8. A hydrocarbon fluid conversion process, comprising subjecting a mixture of normally liquid hydrocarbons and normally gaseous hydrocarbons to sufficient heat and pressure to cause conversion of the same, then reducing the pressure on the resulting mixture to a lower one and introducing the same into a fractionating zone, fractionating the mixture under said lower pressure and thereby separating hydrocarbon vapors and hydrocarbon gases lighter than gasoline from gasoline and heavier liquids, passing said vapors and gases through an absorption zone, feeding a hydrocarbon liquid heavier than gasoline through the absorption zone and thereby absorbing some of the hydrocarbon vapors and gases, admixing the last mentioned liquid with the first mentioned mixture and simultaneously converting the same with the first mentioned mixture while the latter is flowing toward and finally into said fractionating zone, passing gasoline and heavier liquid from said fractionating zone and again reducing the pressure on the same to a still lower one and introducing said gasoline and heavier liquid into a second fractionating zone, fractionating the gasoline and heavier liquid in the second fractionating zone under the last mentioned pressure, and thereby separating gasoline from liquid heavier than gasoline.

9. A process for converting a mixture consisting of normally liquid hydrocarbons and normally gaseous hydrocarbons, comprising flowing said mixture through an elongated passageway of restricted cross sectional area arranged in a heating zone while maintaining the mixture under superatmospheric pressure and at a temperature suitable for the thermal conversion of the mixture, separating the converted mixture into fractions, one of which is a liquid fraction, introducing said liquid fraction into a fractionating zone at a first point above the bottom of said fractionating zone, recirculating liquid from said fractionating zone at a higher point through the heating zone and back into the fractionating zone at a lower point than the first mentioned point, and withdrawing products of the process from the fractionating zone at points above and below the first three points.

10. A process for converting a mixture consisting of normally liquid hydrocarbons and normally gaseous hydrocarbons, comprising passing said mixture through an elongated passageway of restricted cross sectional area arranged in a heating zone, while maintaining the mixture under sufficient heat and pressure to convert the mixture, flowing the converted mixture from said passageway through a second passageway into a fractionating zone, expanding the mixture as it flows through the second passageway into the fractionating zone, withdrawing a liquid fraction from the fractionating zone at a higher point than that at which the mixture enters the fractionating zone, cooling said liquid fraction, and forcing said liquid fraction into the second passageway at a point anterior to the point of expansion.

11. A process for converting a mixture consisting of normally liquid hydrocarbons and normally gaseous hydrocarbons, comprising subjecting the mixture to sufficient heat and pressure to cause conversion of the same, then reducing the pressure on the mixture to a lower one and introducing the same into a fractionating zone, fractionating the mixture under said lower pressure and thereby separating a mixture of lighter and heavier gases from gasoline and heavier liquids, passing said mixture of gases through an absorption zone and therein contacting the same with heavier oil and thereby absorbing heavier gases from the mixture of gases, venting lighter gases from the absorption zone and discharging the same from the process, admixing the last mentioned oil with the first mentioned mixture and simultaneously cracking the same with the first mentioned mixture while the latter is flowing toward and finally into said fractionating zone, discharging gasoline and heavier liquid in separate streams from said fractionating zone and again reducing the pressure to a still lower one and introducing said separate streams into a second fractionating zone at different elevations, fractionating the gasoline and heavier liquid in the second fractionating zone under the last mentioned pressure, and thereby separating gasoline from hydrocarbon heavier than gasoline.

12. A process for converting a mixture consisting of normally liquid hydrocarbons and normally gaseous hydrocarbons, comprising subjecting the mixture to sufficient heat and pressure to cause conversion of the same, then reducing the pressure on the mixture to a lower one and introducing the same into a fractionating zone, fractionating the mixture under said lower pressure and thereby separating a mixture of lighter and heavier gases from gasoline and heavier liquids, passing said mixture of gases through an absorption zone and therein contacting the same with heavier oil and thereby absorbing heavier gases from the mixture of gases, venting lighter gases from the absorption zone and discharging the same from the process, admixing the last mentioned oil with the first mentioned mixture and simultaneously cracking the same with the first mentioned mixture while the latter is flowing toward and finally into said fractionating zone, discharging gasoline and heavier liquid in separate streams from said fractionating zone and again reducing the pressure to a still lower one and introducing said separate streams into a second fractionating zone at different elevations, fractionating the gasoline and heavier liquid in the second fractionating zone under the last mentioned pressure and thereby separating gasoline from hydrocarbon heavier than gasoline, and returning some of the last mentioned liquid for reprocessing in the same cycle with the first mentioned mixture.

13. A process for converting a mixture consisting of normally liquid hydrocarbons and normally gaseous hydrocarbons, comprising subjecting the mixture to sufficient heat and pressure to cause conversion of the same, then reducing the pressure on the mixture to a lower one and introducing the same into a fractionating zone, fractionating the mixture under said lower pressure and thereby separating a mixture of lighter and heavier gases from gasoline and heavier liquids, passing said mixture of gases through an absorption zone and therein contacting the same with heavier oil and thereby absorbing heavier gases from the mixture of gases, venting lighter gases from the absorption zone and discharging the same from the process, admixing the last mentioned oil with the first mentioned mixture and simultaneously cracking the same with the first mentioned mixture while the latter is flowing toward and finally into said fractionating zone, discharging gasoline and heavier liquid in separate streams from said fractionating zone and again reducing the pressure to a still lower one and introducing said separate streams into a second fractionating zone at different elevations, fractionating the gasoline and heavier liquid in the second fractionating zone under the last mentioned pressure and thereby separating gasoline from hydrocarbon heavier than gasoline, and circulating a portion of the last mentioned liquid from and back into the second fractionating zone while heating the liquid exteriorly of the last mentioned zone during such circulation.

14. A process for converting hydrocarbon fluids, comprising passing a mixture of normally liquid hydrocarbons and normally gaseous hydrocarbons in a restricted stream through a heating zone while subjecting the same to sufficient heat and superatmospheric pressure to convert a portion of the oil, fractionating the resulting mixture and thereby separating a first fraction of hydrocarbons lighter than gasoline from gasoline and heavier hydrocarbons, condensing a portion of said fraction, contacting the uncondensed portion of said fraction with the first mentioned oil and thereby absorbing a part of the uncondensed portion of said fraction in said oil before feeding the latter into the heating zone, venting the unabsorbed part of the uncondensed portion of the fraction from the system, and mixing the condensed portion of said fraction with the oil before feeding said oil into the heating zone.

15. A process for converting hydrocarbon fluids, comprising passing a mixture of normally gaseous hydrocarbons and normally liquid hydrocarbons in a restricted stream through a heating zone and therein subjecting the oil to sufficient heat and superatmospheric pressure to convert a portion of the oil, subjecting the resulting mixture to reflux condensation and thereby separating a fraction of hydrocarbons lighter than gasoline from gasoline and heavier hydrocarbons, cooling said fraction and thereby condensing a portion of the same, passing the uncondensed portion of said fraction to an absorption zone and therein contacting the same with the first mentioned oil under superatmospheric pressure and absorbing a part of the uncondensed portion of the fraction in the oil before feeding the latter into the heating zone, mixing a part of the condensed portion of said fraction with the oil after the latter has contacted with the uncondensed portion of said fraction, returning another part of the condensed portion of the fraction to the reflux condensation zone, and utilizing the same therein as a reflux agent, and discharging the unabsorbed part of the uncondensed portion of the fraction from said absorption zone.

MALCOLM P. YOUKER.